United States Patent
Wong

(10) Patent No.: US 12,260,087 B2
(45) Date of Patent: Mar. 25, 2025

(54) OUTPUT DRIVING AND INPUT ON-DIE TERMINATION MECHANISM CAPABLE OF SUPPORTING DIFFERENT REQUIREMENTS OF DIFFERENT FLASH MEMORY SPECIFICATION STANDARDS

(71) Applicant: Silicon Motion, Inc., Hsinchu County (TW)

(72) Inventor: Zih-Yang Wong, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 155 days.

(21) Appl. No.: 18/122,695

(22) Filed: Mar. 16, 2023

(65) Prior Publication Data

US 2024/0311007 A1   Sep. 19, 2024

(51) Int. Cl.
*H04L 25/02* (2006.01)
*G06F 3/06* (2006.01)
*H03K 19/00* (2006.01)

(52) U.S. Cl.
CPC ............ *G06F 3/061* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 11,335,386 B1 | 5/2022 | Hong | |
| 2014/0347092 A1* | 11/2014 | Amirkhany | G06F 13/4086 326/30 |
| 2015/0205751 A1* | 7/2015 | Oh | G06F 13/4221 710/106 |
| 2021/0174861 A1* | 6/2021 | Kim | G11C 11/4093 |

FOREIGN PATENT DOCUMENTS

| | | |
|---|---|---|
| TW | 201403597 A | 1/2014 |
| TW | 202036546 A | 10/2020 |

\* cited by examiner

*Primary Examiner* — Anh Q Tran
(74) *Attorney, Agent, or Firm* — Winston Hsu

(57) ABSTRACT

An input/output (I/O) interface circuit, disposed within a flash memory controller and to be coupled to a flash memory externally coupled to the flash memory controller through an I/O signal port of the flash memory controller, includes a transmission and on-die termination circuit operating as either an output driving stage circuit or an input on-die termination stage circuit. The transmission and on-die termination circuit operates as the output driving stage circuit to transfer and drive a transmission signal, sent from the processor circuit of the flash memory controller, to the flash memory through the I/O signal port. The transmission and on-die termination circuit operates as the input on-die termination stage circuit for generating and providing a matching termination resistance for the I/O signal port.

16 Claims, 4 Drawing Sheets

OUTPUT DRIVING AND INPUT ON-DIE TERMINATION MECHANISM CAPABLE OF SUPPORTING DIFFERENT REQUIREMENTS OF DIFFERENT FLASH MEMORY SPECIFICATION STANDARDS

BACKGROUND OF THE INVENTION

1. Field of the Invention

The invention relates to an input/output interface circuit mechanism, and more particularly to an input/output interface circuit, a flash memory controller, and a corresponding method.

2. Description of the Prior Art

Generally speaking, a conventional input/output circuit disposed in a controller circuit chip is used as a specific signal matching circuit network arranged for providing a fixed signal matching resistance upon a signal transmission or a signal reception. However, this conventional input/output circuit cannot meet the requirements of the currently and fast developed specification standards.

SUMMARY OF THE INVENTION

Therefore one of the objectives of the invention is to provide a flash memory input/output circuit and a corresponding flash memory controller, to solve the above-mentioned problems.

According to embodiments of the invention, an input/output (I/O) interface circuit, disposed within a flash memory controller and to be coupled to a flash memory externally coupled to the flash memory controller, is disclosed. The I/O interface circuit comprises a transmission and on-die termination circuit and a controlling circuit. The transmission and on-die termination circuit operates as either an output driving stage circuit or an input on-die termination stage circuit. The controlling circuit is coupled to the transmission and on-die termination circuit, and arranged for receiving at least one control signal sent from a processor circuit and using the at least one control signal to control the transmission and on-die termination circuit as the output driving stage circuit transferring and driving a transmission signal, sent from the processor circuit of the flash memory controller, to the flash memory through the I/O signal port and to control the transmission and on-die termination circuit as the input on-die termination stage circuit generating and providing a matching termination resistance for the I/O signal port.

According to the embodiments, a flash memory controller, to be externally coupled to a flash memory through an input/output (I/O) signal port of the flash memory controller, is disclosed. The flash memory controller comprises the I/O signal port, the processor circuit, and the above-mentioned I/O interface circuit.

According to the embodiments, a method of an input/output (I/O) interface circuit, disposed within a flash memory controller and to be coupled to a flash memory externally coupled to the flash memory controller through an I/O signal port of the flash memory controller, is disclosed. The method comprises: providing a transmission and on-die termination circuit operating as either an output driving stage circuit or an input on-die termination stage circuit; receiving at least one control signal sent from a processor circuit; using the at least one control signal to control the transmission and on-die termination circuit as the output driving stage circuit transferring and driving a transmission signal, sent from the processor circuit of the flash memory controller, to the flash memory through the I/O signal port; and using the at least one control signal to control the transmission and on-die termination circuit as the input on-die termination stage circuit generating and providing a matching termination resistance for the I/O signal port.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of a configurable, flexible, and adjustable input/output (I/O) interface circuit applied into an electronic device such as a flash memory controller chip circuit (not limited) to meet different requirements of different flash memory products and different flash memory standard specifications or different standard versions by using the same I/O circuit design. The I/O circuit design is associated with an output driving and input on-die termination/terminated (ODT) stage circuit mechanism which can be used as either an output driving stage circuit or an input ODT stage circuit.

Figure 1:
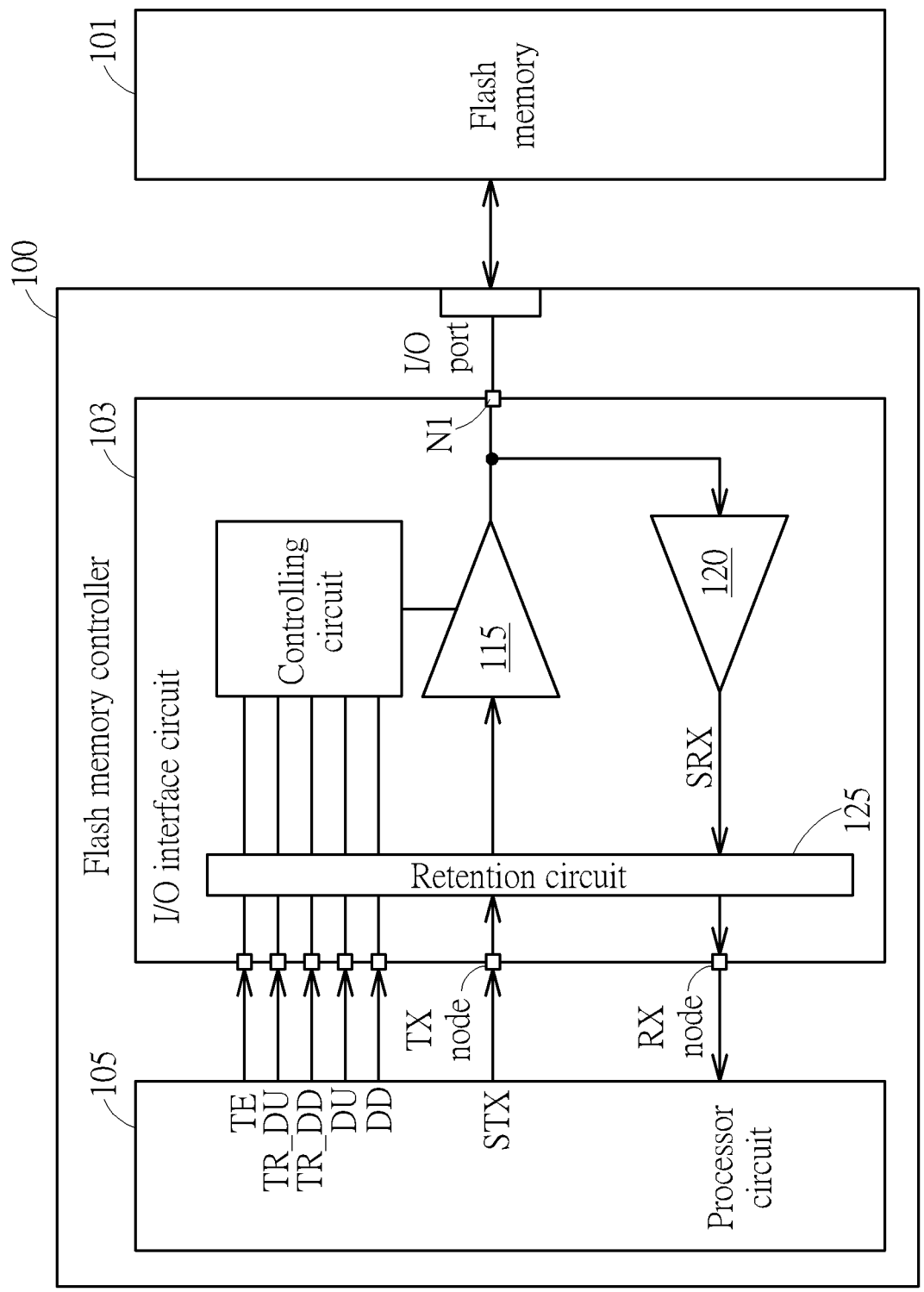
FIG. 1 is a diagram of a circuit block of an input/output (I/O) interface circuit of an electronic device such as a flash memory controller according to an embodiment of the invention.

FIG. 1 is a diagram of a circuit block of an input/output (I/O) interface circuit 103 of an electronic device 100 such as a flash memory controller chip circuit according to an embodiment of the invention.

The flash memory controller 100 comprises at least one I/O signal port, a processor circuit 105, and at least one I/O interface circuit 103 corresponding to the at least one I/O signal port. The flash memory controller 100 is externally coupled to the flash memory 101 through the I/O signal port which may be a physical signal pad/pin. For example, the flash memory controller 100 may comprise multiple physical I/O signal pads/pins and multiple I/O interface circuits 103 respectively corresponding to the multiple physical I/O signal pads/pins. In addition, the I/O interface circuit 103 comprises a controlling circuit 110, a transmission and on-die termination (TX/ODT) circuit 115, a specific node N1 coupled to the I/O signal port, a receiver (RX) circuit 120, a retention circuit 125, a TX node, a RX node, and multiple control nodes respectively coupled to the control signals TE, TR_DU, TR_DD, DU, and DD.

The processor circuit 105, which can execute/perform at least one firmware program, is arranged to transmit or send a transmission signal STX to the flash memory 101 through the I/O signal port and the I/O interface circuit 103, wherein the transmission signal STX may carry a digital waveform having a high level and a low level. The transmission signal STX, to be outputted from the I/O signal port, is transmitted to the I/O interface circuit 103 through the TX node and then is temporarily kept by the retention circuit 125. The transmission signal STX then is transmitted from the retention circuit 125 into the I/O signal port through the TX/ODT circuit 115 which is controlled by the controlling circuit 110 to operate as an output driving stage circuit for driving and outputting the transmission signal STX into the flash memory 101 through the I/O signal port.

Alternatively, when the flash memory 101 sends a reception signal SRX into the flash memory controller 100 through the I/O signal port, the controlling circuit 110 controls the TX/ODT circuit 115 operating as an input ODT stage circuit for providing a corresponding matching termination resistance for the reception signal SRX that may carry a digital waveform having a high level and a low level and is to be received by the RX circuit 120 and retention circuit 125. The reception signal SRX is also temporarily kept by the retention circuit 125 and then transmitted from the retention circuit 125 into the processor circuit 105 through the RX node.

The transmission signal STX or the reception signal SRX may be used to carry at least one of communication information, flash memory commands, address information, and data of a specific data unit size such as a page data, a block data, and so on.

The TX/ODT circuit 115 is arranged to operate as either the output driving stage circuit or the input ODT stage circuit, and the controlling circuit 110 is arranged for receiving at least one control signal such as TE, TR_DU, TR_DD, DU, and/or DD sent from the firmware program running on the processor circuit 105 so as to control TX/ODT circuit 115 providing the capability of output driving or input ODT resistance matching.

Further, in one embodiment, the controlling circuit 110 can control the TX/ODT circuit 115 forming a first tapped termination structure in response to a first product specification requirement and controls the TX/ODT circuit 115 forming a second tapped termination structure, different from the first tapped terminal structure, in response to a second product specification requirement. In one embodiment, the first tapped termination structure is a center tapped termination (CTT) structure, and the second tapped termination structure is a low tapped termination (LTT) structure. For example (but not limited), the first product specification requirement defines the NV-DDR3 data interface, and the second product specification requirement defines the NV-LPDDR4 data interface.

Further, in one embodiment, the controlling circuit 110 may control the TX/ODT circuit 115 generating and providing different matching termination resistances for the I/O signal port in response to different product specification requirements when the TX/ODT circuit 115 is used as the input on-die termination stage circuit.

Further, the control signals TE, TR_DU, TR_DD, DU, and/or DD can be preset or adjusted by the firmware program based on a user's design requirements. Thus, the circuit design becomes more flexible and configurable.

Figure 2:
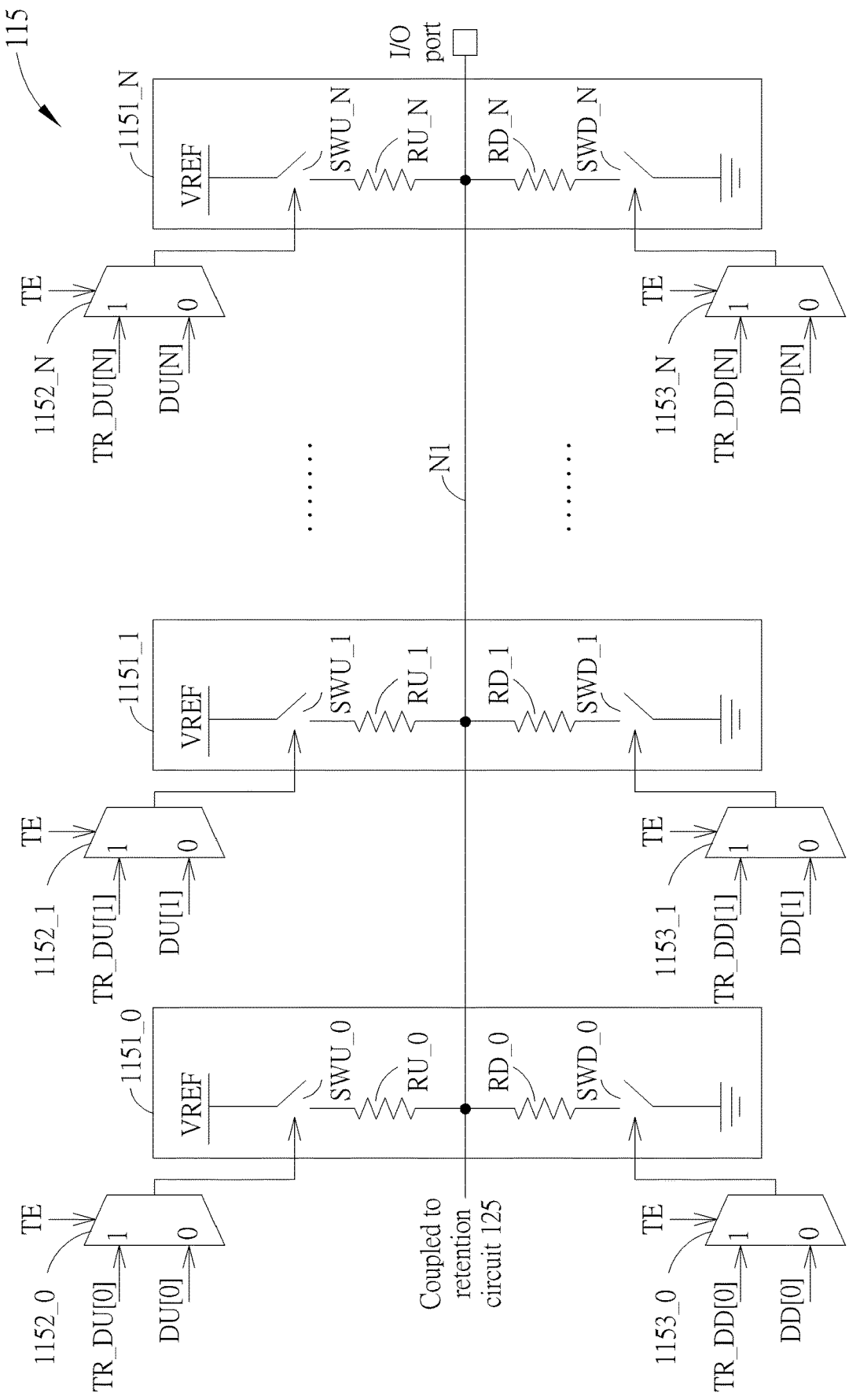
FIG. 2 is a circuit diagram of the transmission and on-die termination circuit according to an embodiment of the invention.

Refer to FIG. 2. FIG. 2 is a circuit diagram of the TX/ODT circuit 115 of FIG. 1 according to an embodiment of the invention. In FIG. 2, the TX/ODT circuit 115 is used as a transmitter circuit (i.e. the output driving stage circuit) when the flash memory controller 100 operates under a signal transmission mode in which the I/O signal port is used as an output port, and it is used as an receiver (RX) impedance matching circuit such as the input ODT stage circuit when the flash memory controller 100 operates under a signal reception mode in which the I/O signal port is used as an input port.

The TX/ODT circuit 115 for example comprises a plurality of impedance circuits 1151_0, 1151_1, . . . , 1151_N, a plurality of first multiplexers 1152_0, 1152_1, . . . , 1152_N, and a plurality of second multiplexers 1153_0, 1153_1, . . . , 1153_N, and the specific node N1 to be coupled between the retention circuit 125 and the I/O signal port.

In FIG. 2, the plurality of impedance circuits 1151_0, 1151_1, . . . , 1151_N may respectively comprise a plurality of first resistor units RU_0, RU_1, . . . , RU_N, a plurality of first switch units SWU_0, SWU_1, . . . , SWU_N, a plurality of second resistor units RD_0, RD_1, . . . , RD_N, a plurality of second switch units SWD_0, SWD_1, . . . , SWD_N. The specific node N1 is coupled between the first resistor units RU_0, RU_1, . . . , RU_N and the second resistor units RD_0, RD_1, . . . , RD_N. In addition, each impedance circuit 1151_0, 1151_1, . . . , 1151_N equivalently comprises a corresponding first switch unit, a corresponding first resistor unit, a corresponding second switch unit, and a corresponding second resistor unit. The resistances of the different impedance circuits may be different from each other.

Each corresponding first multiplexer 1152_0, 1152_1, . . . , 1152_N has a first input coupled to and arranged for receiving a first control signal such as a corresponding bit portion signal of the control signal TR_DU, a second input coupled to and arranged for receiving a second control signal such as a corresponding bit portion signal of the control signal DU, a control input coupled to a setting signal such as the control signal TE, and an output for transmitting and outputting the selected bit portion signal based on the setting signal TE to turn on/off the corresponding first switch unit. For example (but not limited), the first multiplexer 1152_0 selects the bit portion signal TR_DU[0] of the control signal TR_DU as the control signal for turning on/off the first switch unit SWU_0 when the setting signal TE indicates the logic level '1', and it selects the bit portion signal DU[0] of the control signal DU as the control signal for turning on/off the first switch unit SWU_0 when the setting signal TE indicates the logic level '0'. For example (but not limited), the first switch unit SWU_0 is turned on to become closed by the bit portion signal TR_DU[0] indicating the logic level '1' or by the bit portion signal DU[0] indicating the logic level '1', and it is turned off to become open by the bit portion signal TR_DU[0] indicating the logic level '0' or by the bit portion signal DU[0] indicating the logic level '0'. The operations of the other first multiplexers 1152_1, . . . , 1152_N and the other first switch units SWU_1, . . . , SWU_N are similar to the above-mentioned operations of the first multiplexer 1152_0 and first switch unit SWU_0, and are not detailed for brevity.

Similarly, each corresponding second multiplexer 1153_0, 1153_1, . . . , 1153_N has a first input coupled to and arranged for receiving a third control signal such as a corresponding bit portion signal of the control signal TR_DD, a second input coupled to and arranged for receiving a fourth control signal such as a corresponding bit portion signal of the control signal DD, a control input coupled to the setting signal such as the control signal TE, and an output for transmitting and outputting the selected bit portion signal based on the setting signal TE to turn on/off the corresponding second switch unit. For example (but not limited), the second multiplexer 1153_0 selects the bit portion signal TR_DD[0] of the control signal TR_DD as the control signal for turning on/off the second switch unit SWD_0 when the setting signal TE indicates the logic level '1', and it selects the bit portion signal DD[0] of the control signal DD as the control signal for turning on/off the second switch unit SWD_0 when the setting signal TE indicates the logic level '0'. For example (but not limited), the second switch unit SWD_0 is turned on to become closed by the bit portion signal TR_DD[0] indicating the logic level '1' or by the bit portion signal DD[0] indicating the logic level '1', and it is turned off to become open by the bit portion signal TR_DD[0] indicating the logic level '0' or by the bit portion signal DD[0] indicating the logic level '0'. The operations of the other second multiplexers 1153_1, ..., 1153_N and the other second switch units SWD_1, ..., SWD_N are similar to the above-mentioned operations of the second multiplexer 1153_0 and second switch unit SWD_0, and are not detailed for brevity.

In the impedance circuit 1151_0, in FIG. 2, the first switch unit, e.g. SWU_0, and the first resistor unit, e.g. RU_0, are coupled in series and disposed between the first reference level such as a supply reference voltage level VREF and the specific node N1 (connected to the I/O signal port and the coupled to the retention circuit 125) if the first switch unit, e.g. SWU_0, is at the closed state. The positions of the first switch unit, e.g. SWU_0, and the first resistor unit, e.g. RU_0, can be exchanged in other embodiments. In addition, the second switch unit, e.g. SWD_0, and the second resistor unit, e.g. RD_0, are coupled in series and disposed between the second reference level such as the ground level and the specific node (connected to the I/O signal port and the coupled to the retention circuit 125) if the second switch unit, e.g. SWD_0, is at the closed state. The positions of the second switch unit, e.g. SWD_0, and the second resistor unit, e.g. RD_0, can be exchanged in other embodiments. The operations and circuit connections/structures of the circuit elements of the other impedance circuits are similar to those of the impedance circuit 1151_0 and are not detailed for brevity.

In one scenario example, when the TX/ODT circuit 115 is used as the input ODT stage circuit for the RX circuit 120 or the reception signal SRX if the I/O interface circuit 103 operates under a signal reception transmission mode (i.e. RX mode), the setting signal TE, sent from the processor circuit 105 and then outputted by the controlling circuit 110, indicates the logic level/information '1'. In this situation the on/off states of the first switch units SWU_0, SWU_1, ..., SWU_N are respectively controlled by the bit portion signals TR_DU[0], TR_DU[1], ..., TR_DU[N], and the on/off states of the second switch units SWD_0, SWD_1, ..., SWD_N are respectively controlled by the bit portion signals TR_DD[0], TR_DD[1], ..., TR_DD[N]. Thus, the processor circuit 105 can send the two control signals TR_DU and TR_DD to control the TX/ODT circuit 115 providing/generating a better or optimal matching termination resistance value for the reception signal SRX which is to be received by the RX circuit 120 through the I/O signal port from the flash memory 101.

For example (but not limited), the first switch units SWU_0, SWU_1, ..., SWU_N and second switch units SWD_0, SWD_1, ..., SWD_N may be implemented by using MOSFETs (Metal Oxide Semiconductor Field Effect Transistors) respectively. In one embodiment, when the processor circuit 105 is arranged to control the TX/ODT circuit 115 operating in the CTT structure mode of the input ODT stage circuit, at least one first switch unit (e.g. SWU_0) and at least one second switch unit (e.g. SWD_0) disposed within at least one the same impedance circuit are used as at least one pull-up MOS transistor and at least one pull-down MOS transistor, and may be controlled by the corresponding bit portion signals TR_DU[0] and TR_DD[0] to be at the closed state. In another embodiment, when the processor circuit 105 is arranged to control the TX/ODT circuit 115 operating in the LTT structure mode of the input ODT stage circuit, at least one the first switch unit (e.g. SWU_0) and at least one the second switch unit (e.g. SWD_0) disposed within at least one the same impedance circuit may be controlled by the corresponding bit portion signals TR_DU[0] and TR_DD[0] to be at the open state and the closed state respectively; that is, the first switch unit (e.g. SWU_0) is open, and the at least one the second switch unit (e.g. SWD_0) is used as at least one pull-down MOS transistor. By doing so, the processor circuit 105 (or the flash memory controller 100) can operate in the CTT mode or the LTT mode dynamically in response to the different product specification requirements and/or different specification standard versions. The circuit design or configuration is flexible and configurable.

Alternatively, in another example scenario, when the TX/ODT circuit 115 is used as the output driving stage circuit for the transmission signal STX if the I/O interface circuit 103 operates under a signal transmission mode (i.e. TX mode), the setting signal TE, sent from the processor circuit 105 and then outputted by the controlling circuit 110, indicates the logic level/information '0'. Thus in this situation the on/off states (or conductance states) of the first switch units SWU_0, SWU_1, ..., SWU_N are respectively controlled by the bit portion signals DU[0], DU[1], ..., DU[N], and the on/off states (or conductance states) of the second switch units SWD_0, SWD_1, ..., SWD_N are respectively controlled by the bit portion signals DD[0], DD[1], ..., DD[N]. Thus, the processor circuit 105 can send the two control signals DU and DD to control the TX/ODT circuit 115 as a better or optimal signal driving circuit to drive and output the transmission signal STX into the flash memory 101 through the I/O signal port.

For example (but not limited), similarly, the first switch units SWU_0, SWU_1, ..., SWU_N and second switch units SWD_0, SWD_1, ..., SWD_N may be implemented by using MOSFETs (Metal Oxide Semiconductor Field Effect Transistors) respectively. In one embodiment, when the processor circuit 105 is arranged to control the TX/ODT circuit 115 operating in the CTT structure mode of the output driving stage circuit, at least one first switch unit (e.g. SWU_0) and at least one second switch unit (e.g. SWD_0) disposed within at least one the same impedance circuit are used as at least one pull-up MOS transistor and at least one pull-down MOS transistor, and may be controlled by the corresponding bit portion signals DU[0] and DD[0] respectively; in this condition, the at least one first switch unit (e.g. SWU_0) and at least one second switch unit (e.g. SWD_0) can be used to replace the functions and operations of the pull-up and pull-down MOS transistors of a conventional scheme. That is, the at least one first switch unit (e.g. SWU_0) and at least one second switch unit (e.g. SWD_0) can be used as the role of an output driver with an input ODT circuit in the CTT structure mode.

In another embodiment, when the processor circuit 105 is arranged to control the TX/ODT circuit 115 operating in the LTT structure mode of the output driving stage circuit, at least one the first switch unit (e.g. SWU_0) and at least one the second switch unit (e.g. SWD_0) disposed within at least one the same impedance circuit are used as at least one pull-up MOS transistor and at least one pull-down MOS transistor, and may be controlled by the corresponding bit portion signals DU[0] and DD[0]. Similarly, in this condition, the at least one first switch unit (e.g. SWU_0) and at least one second switch unit (e.g. SWD_0) can be used to replace the functions and operations of the pull-up and pull-down MOS transistors of the conventional scheme. That is, the at least one second switch unit (e.g. SWD_0) can be used as the role of an output driver with an input ODT circuit in the LTT structure mode. By doing so, the processor circuit 105 (or the flash memory controller 100) can operate in the CTT mode or the LTT mode dynamically in response to the different product specification requirements and/or different specification standard versions. The circuit design or configuration is flexible and configurable.

In one embodiment, the resistances of the first resistor units RU_0, RU_1, . . . , RU_N may be different from each other, and the resistances of the second resistor units RD_0, RD_1, . . . , RD_N may be different from each other. In addition, the resistances of a first resistor unit and a second resistor unit in the same impedance circuit may be equal or different in response to the design of a user.

Based on the above operations, in response to the user's different requirements for the different product specifications, the processor circuit 105 can generate and send the control signals such as TR_DU and TR_DD carrying different bit portion information for the different product specifications into the I/O interface circuit 103 so as to control the TX/ODT circuit 115 providing a first matching termination resistance for the reception signal SRX in response to a first product specification or providing a second matching termination resistance for the reception signal SRX in response to a second product specification which different from the first product specification. Similarly, the processor circuit 105 may generate and send the control signals such as DU and DD carrying different bit portion information for the different product specifications into the I/O interface circuit 103 so as to control the TX/ODT circuit 115 providing a third matching termination resistance for the transmission signal STX in response to the first product specification or providing a fourth matching termination resistance for the transmission signal STX in response to the second product specification which different from the first product specification. It is flexible and configurable for the design in response to the different product specifications when the flash memory controller 100 is applied into and manufactured as different products.

Figure 3:
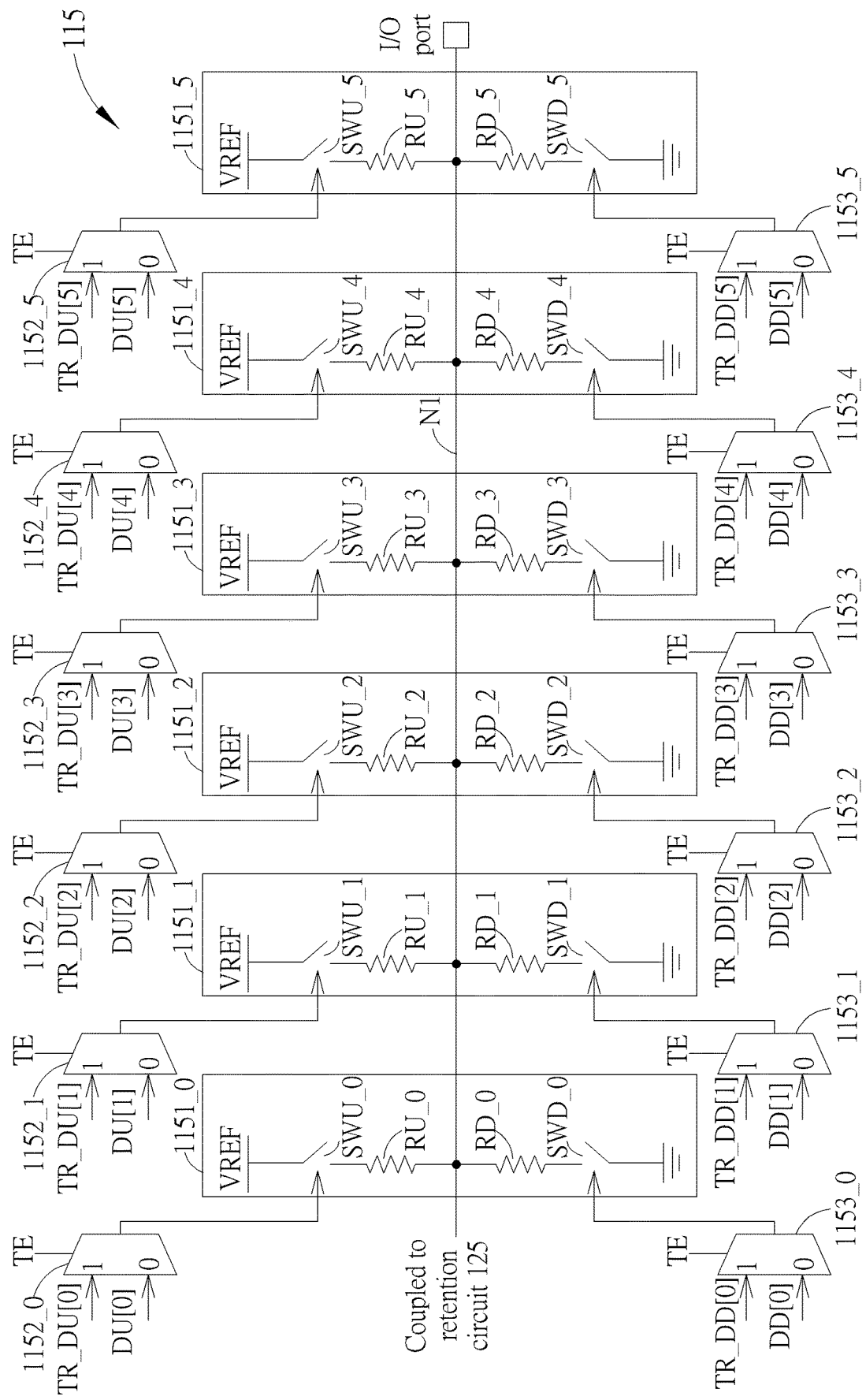
FIG. 3 is a circuit diagram of the transmission and on-die termination circuit according to another embodiment of the invention.

FIG. 3 is a circuit diagram of the TX/ODT circuit 115 according to another embodiment of the invention. In FIG. 3, the TX/ODT circuit 115 comprises six impedance circuits 1151_0, 1151_1, 1151_2, 1151_3, 1151_4, 1151_5, six corresponding first multiplexers 1152_0, 1152_1, 1152_2, 1152_3, 1152_4, 1152_5, and six corresponding second multiplexers 1153_0, 1153_1, 1153_2, 1153_3, 1153_4, 1153_5. Each impedance circuits 1151_0, 1151_1, 1151_2, 1151_3, 1151_4, 1151_5 comprises the corresponding circuit elements as shown in FIG. 3 and are not detailed for brevity. For example (but not limited), the resistances of the first resistor units and second resistor units are shown in the following table:

| Resistor units | Configured Resistance Values |
|---|---|
| RU_0, RD_0 | R |
| RU_1, RD_1 | $\frac{R}{2}$ |
| RU_2, RD_2 | $\frac{R}{4}$ |
| RU_3, RD_3 | $\frac{R}{8}$ |
| RU_4, RD_4 | $\frac{R}{16}$ |
| RU_5, RD_5 | $\frac{R}{32}$ |

'R' in the table indicates a configured reference resistance value. In this example, the resistances of the first resistor unit and second resistor unit disposed in the same impedance circuit are configured to be identical; this is not intended to be a limitation. In addition, the resistances of the first resistor units respectively disposed in the different impedance circuits are configured based on the plurality of weights of a binary numeration system, e.g., $$\frac{1}{2^0}, \frac{1}{2^1}, \frac{1}{2^2}, \frac{1}{2^3}, \frac{1}{2^4}, \frac{1}{2^5}.$$

Similarly, the resistances of the second resistor units respectively disposed in the different impedance circuits are configured based on the plurality of weights of a binary numeration system, e.g., $$\frac{1}{2^0}, \frac{1}{2^1}, \frac{1}{2^2}, \frac{1}{2^3}, \frac{1}{2^4}, \frac{1}{2^5}.$$

By doing so, the processor circuit 105 can for example control the states of the first switch units SWU_0, SWU_1, SWU_2, SWU_3, SWU_4, SWU_5 to provide different resultant resistance value. For example (but not limited), the resultant resistance value of all the first resistor units in FIG. 3 may be equal to R if only one the switch unit SWU_0 is closed and the other switch units SWU_1, SWU_2, SWU_3, SWU_4, SWU_5 are open. The resultant resistance value of all the first resistor units in FIG. 3 may be equal to R/2 if only the switch unit SWU_1 is closed and the other switch units SWU_0, SWU_2, SWU_3, SWU_4, SWU_5 are open. The resultant resistance value of all the first resistor units in FIG. 3 may be equal to R/3 if only the two switch units SWU_0, SWU_1 are closed and the other switch units SWU_2, SWU_3, SWU_4, SWU_5 are open. The resultant resistance value of all the first resistor units in FIG. 3 may be equal to R/4 if only the switch unit SWU_2 is closed and the other switch units SWU_0, SWU_1, SWU_3, SWU_4, SWU_5 are open. Similarly, the resultant resistance value of all the first resistor units in FIG. 3 can be R/5 if only the switch unit SWU_0, SWU_2 are closed and the other switch units SWU_1, SWU_3, SWU_4, SWU_5 are open. Similarly, the resultant resistance value of all the first resistor units in FIG. 3 can be $$\frac{R}{63}$$

if all the first switch units are closed and no first switch units are open. By doing so, the resultant resistance value of all the first resistor units in FIG. 3 can be at the 64-levels control capability range which range from the maximum resistance level R to the minimum resistance level $$\frac{R}{63}.$$

Identically, the resultant resistance value of all the second resistor units in FIG. 3 can be at the 64-levels control capability range which range from the maximum resistance level R to the minimum resistance level $$\frac{R}{63}.$$

This effectively meets the different signal matching requirements of the transmission signal STX and the reception signal SRX. This also effectively reduces the signal reflection, and the signal quality can be significantly improved. The circuit cost can be reduced as well as the circuit design can become more flexible, scalable, and adjustable.

Figure 4:
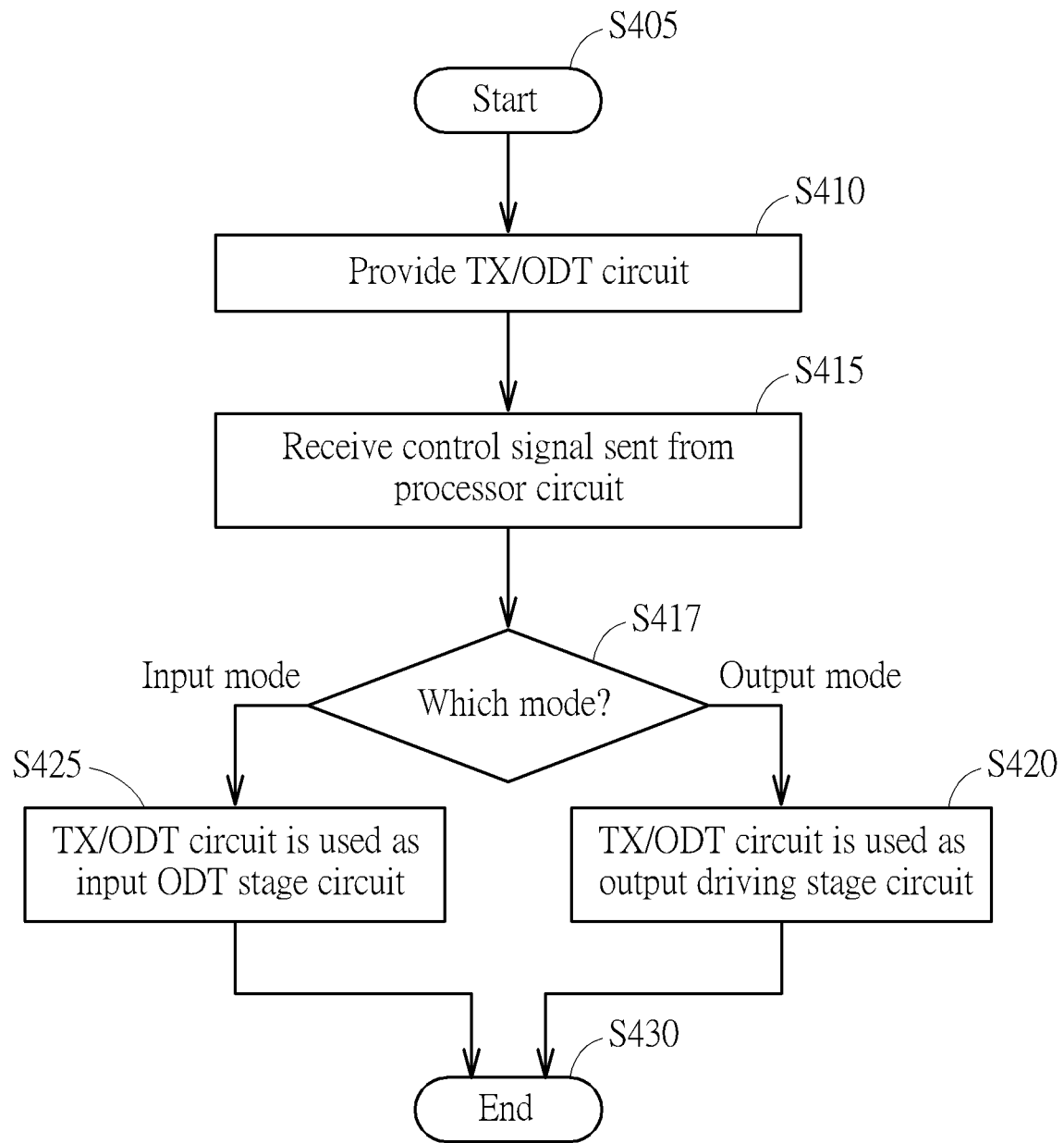
FIG. 4 is a flowchart diagram of the operations of the I/O interface circuit in FIG. 1 according to an embodiment of the invention.

FIG. 4 is a flowchart diagram of the operations of the I/O interface circuit 103 in FIG. 1 according to an embodiment of the invention. Provided that substantially the same result is achieved, the steps of the flowchart shown in FIG. 4 need not be in the exact order shown and need not be contiguous, that is, other steps can be intermediate. Steps are detailed in the following:

Step S405: Start;
Step S410: Provide a transmission and on-die termination circuit operating as either an output driving stage circuit or an input on-die termination stage circuit;
Step S415: Receive at least one control signal sent from a processor circuit;
Step S417: Determine which mode the I/O interface circuit operates;
Step S420: Use the at least one control signal to control the transmission and on-die termination circuit as the output driving stage circuit transferring and driving a transmission signal, sent from the processor circuit of the flash memory controller, to the flash memory through the I/O signal port;
Step S425: Use the at least one control signal to control the transmission and on-die termination circuit as the input on-die termination stage circuit generating and providing a matching termination resistance for the I/O signal port; and
Step S430: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input/output (I/O) interface circuit, disposed within a flash memory controller and to be coupled to a flash memory externally coupled to the flash memory controller through an I/O signal port of the flash memory controller, comprising:

a transmission and on-die termination circuit, operating as either an output driving stage circuit or an input on-die termination stage circuit; and a controlling circuit, coupled to the transmission and on-die termination circuit, for receiving at least one control signal sent from a processor circuit and using the at least one control signal to control the transmission and on-die termination circuit as the output driving stage circuit transferring and driving a transmission signal, sent from the processor circuit of the flash memory controller, to the flash memory through the I/O signal port and to control the transmission and on-die termination circuit as the input on-die termination stage circuit generating and providing a matching termination resistance for the I/O signal port;

wherein the transmission and on-die termination circuit comprises:

a plurality of first multiplexers, a corresponding first multiplexer having a first input coupled to a first control signal sent from the processor circuit of the flash memory controller, a second input coupled to a second control signal sent from the processor circuit, a control input coupled to a setting signal sent from the processor circuit, and an output, the corresponding first multiplexer being arranged for selecting the first control signal or the second control signal as an output signal according to the setting signal;

a plurality of second multiplexers, a corresponding second multiplexer having a first input coupled to a third control signal sent from the processor circuit of the flash memory controller, a second input coupled to a fourth control signal sent from the processor circuit, a control input coupled to the setting signal sent from the processor circuit, and an output, the corresponding second multiplexer being arranged for selecting the third control signal or the fourth control signal as an output signal of the corresponding second multiplexer according to the setting signal; and a plurality of impedance circuits, a corresponding impedance circuit comprising:

a corresponding first switch unit, coupled between a supply reference voltage level and a corresponding first resistor unit, a state of the corresponding first switch unit being controlled by the output signal of the corresponding first multiplexer;

the corresponding first resistor unit having a corresponding first resistance, coupled between the corresponding first switch unit and the I/O signal port;

a corresponding second switch unit, coupled between a ground level and a corresponding second resistor unit, a state of the corresponding second switch unit being controlled by the output signal of the corresponding second multiplexer; and the corresponding second resistor unit having a corresponding second resistance, coupled between the corresponding second switch unit and the I/O signal port;

wherein the corresponding first switch unit and the corresponding first resistor unit are connected in series between the supply reference voltage level and the I/O signal port when the state of the corresponding first switch unit is closed; the corresponding second switch unit and the corresponding second resistor unit are connected in series between the ground level and the I/O signal port when the state of the corresponding second switch unit is closed.

2. The I/O interface circuit of claim 1, wherein the controlling circuit controls the transmission and on-die termination circuit forming a first tapped termination structure in response to a first product specification requirement and controls the transmission and on-die termination circuit forming a second tapped termination structure, different from the first tapped terminal structure, in response to a second product specification requirement.

3. The I/O interface circuit of claim 2, wherein the first tapped termination structure is a center tapped termination structure, and the second tapped termination structure is a low tapped termination structure.

4. The I/O interface circuit of claim 1, wherein the controlling circuit controls the transmission and on-die termination circuit generating and providing different matching termination resistances for the I/O signal port in response to different product specification requirements when the transmission and on-die termination circuit is used as the input on-die termination stage circuit.

5. The I/O interface circuit of claim 1, wherein the corresponding second resistance is different from the corresponding first resistance.

6. The I/O interface circuit of claim 1, wherein a plurality of resistances of a plurality of first resistor units in the plurality of impedance circuits are configured based a plurality of weights of a binary numeration system, and a plurality of resistances of a plurality of second resistor units in the plurality of impedance circuits are configured based the plurality of weights of the binary numeration system.

7. A flash memory controller, to be externally coupled to a flash memory through an input/output (I/O) signal port of the flash memory controller, the flash memory controller comprising:
the I/O signal port, to be externally coupled to the flash memory;
a processor circuit; and
an I/O interface circuit, coupled to the processor circuit and to be coupled to the flash memory, the I/O interface circuit comprising:
a transmission and on-die termination circuit, operating as either an output driving stage circuit or an input on-die termination stage circuit; and
a controlling circuit, coupled to the transmission and on-die termination circuit, for receiving at least one control signal sent from the processor circuit and using the at least one control signal to control the transmission and on-die termination circuit as the output driving stage circuit transferring and driving a transmission signal, sent from the processor circuit of the flash memory controller, to the flash memory through the I/O signal port and to control the transmission and on-die termination circuit as the input on-die termination stage circuit generating and providing a matching termination resistance for the I/O signal port;
wherein the transmission and on-die termination circuit comprises:
a plurality of first multiplexers, a corresponding first multiplexer having a first input coupled to a first control signal sent from the processor circuit of the flash memory controller, a second input coupled to a second control signal sent from the processor circuit, a control input coupled to a setting signal sent from the processor circuit, and an output, the corresponding first multiplexer being arranged for selecting the first control signal or the second control signal as an output signal according to the setting signal;
a plurality of second multiplexers, a corresponding second multiplexer having a first input coupled to a third control signal sent from the processor circuit of the flash memory controller, a second input coupled to a fourth control signal sent from the processor circuit, a control input coupled to the setting signal sent from the processor circuit, and an output, the corresponding second multiplexer being arranged for selecting the third control signal or the fourth control signal as an output signal of the corresponding second multiplexer according to the setting signal; and
a plurality of impedance circuits, a corresponding impedance circuit comprising:
a corresponding first switch unit, coupled between a supply reference voltage level and a corresponding first resistor unit, a state of the corresponding first switch unit being controlled by the output signal of the corresponding first multiplexer;
the corresponding first resistor unit having a corresponding first resistance, coupled between the corresponding first switch unit and the I/O signal port;
a corresponding second switch unit, coupled between a ground level and a corresponding second resistor unit, a state of the corresponding second switch unit being controlled by the output signal of the corresponding second multiplexer; and
the corresponding second resistor unit having a corresponding second resistance, coupled between the corresponding second switch unit and the I/O signal port;
wherein the corresponding first switch unit and the corresponding first resistor unit are connected in series between the supply reference voltage level and the I/O signal port when the state of the corresponding first switch unit is closed; the corresponding second switch unit and the corresponding second resistor unit are connected in series between the ground level and the I/O signal port when the state of the corresponding second switch unit is closed.

8. The flash memory controller of claim 7, wherein the controlling circuit controls the transmission and on-die termination circuit forming a first tapped termination structure in response to a first product specification requirement and controls the transmission and on-die termination circuit forming a second tapped termination structure, different from the first tapped terminal structure, in response to a second product specification requirement.

9. The flash memory controller of claim 8, wherein the first tapped termination structure is a center tapped termination structure, and the second tapped termination structure is a low tapped termination structure.

10. The flash memory controller of claim 7, wherein the controlling circuit controls the transmission and on-die termination circuit generating and providing different matching termination resistances for the I/O signal port in response to different product specification requirements when the transmission and on-die termination circuit is used as the input on-die termination stage circuit.

11. The flash memory controller of claim 7, wherein the corresponding second resistance is different from the corresponding first resistance.

12. The flash memory controller of claim 7, wherein a plurality of resistances of a plurality of first resistor units in the plurality of impedance circuits are configured based a plurality of weights of a binary numeration system, and a plurality of resistances of a plurality of second resistor units in the plurality of impedance circuits are configured based the plurality of weights of the binary numeration system.

13. A method of an input/output (I/O) interface circuit, disposed within a flash memory controller and to be coupled to a flash memory externally coupled to the flash memory controller through an I/O signal port of the flash memory controller, and the method comprising:
providing a transmission and on-die termination circuit operating as either an output driving stage circuit or an input on-die termination stage circuit;
receiving at least one control signal sent from a processor circuit;
using the at least one control signal to control the transmission and on-die termination circuit as the output driving stage circuit transferring and driving a transmission signal, sent from the processor circuit of the flash memory controller, to the flash memory through the I/O signal port;
using the at least one control signal to control the transmission and on-die termination circuit as the input on-die termination stage circuit generating and providing a matching termination resistance for the I/O signal port;
providing a plurality of first multiplexers of the transmission and on-die termination circuit, a corresponding first multiplexer having a first input coupled to a first control signal sent from the processor circuit of the flash memory controller, a second input coupled to a second control signal sent from the processor circuit, a control input coupled to a setting signal sent from the processor circuit, and an output, the corresponding first multiplexer being arranged for selecting the first control signal or the second control signal as an output signal according to the setting signal;
providing a plurality of second multiplexers of the transmission and on-die termination circuit, a corresponding second multiplexer having a first input coupled to a third control signal sent from the processor circuit of the flash memory controller, a second input coupled to a fourth control signal sent from the processor circuit, a control input coupled to the setting signal sent from the processor circuit, and an output, the corresponding second multiplexer being arranged for selecting the third control signal or the fourth control signal as an output signal of the corresponding second multiplexer according to the setting signal; and
providing a plurality of impedance circuits of the transmission and on-die termination circuit, using a corresponding impedance circuit to:
use a corresponding first switch unit, coupled between a supply reference voltage level and a corresponding first resistor unit, to control a state of the corresponding first switch unit by the output signal of the corresponding first multiplexer;
provide the corresponding first resistor unit having a corresponding first resistance, coupled between the corresponding first switch unit and the I/O signal port;
use a corresponding second switch unit, coupled between a ground level and a corresponding second resistor unit, to control a state of the corresponding second switch unit by the output signal of the corresponding second multiplexer; and
provide the corresponding second resistor unit having a corresponding second resistance, coupled between the corresponding second switch unit and the I/O signal port;
wherein the corresponding first switch unit and the corresponding first resistor unit are connected in series between the supply reference voltage level and the I/O signal port when the state of the corresponding first switch unit is closed; the corresponding second switch unit and the corresponding second resistor unit are connected in series between the ground level and the I/O signal port when the state of the corresponding second switch unit is closed.

14. The method of claim 13, further comprising:
controlling the transmission and on-die termination circuit forming a first tapped termination structure in response to a first product specification requirement; and
controlling the transmission and on-die termination circuit forming a second tapped termination structure, different from the first tapped terminal structure, in response to a second product specification requirement.

15. The method of claim 14, wherein the first tapped termination structure is a center tapped termination structure, and the second tapped termination structure is a low tapped termination structure.

16. The method of claim 13, further comprising:
controlling the transmission and on-die termination circuit generating and providing different matching termination resistances for the I/O signal port in response to different product specification requirements when the transmission and on-die termination circuit is used as the input on-die termination stage circuit.

* * * * *